United States Patent Office 2,772,002
Patented Nov. 27, 1956

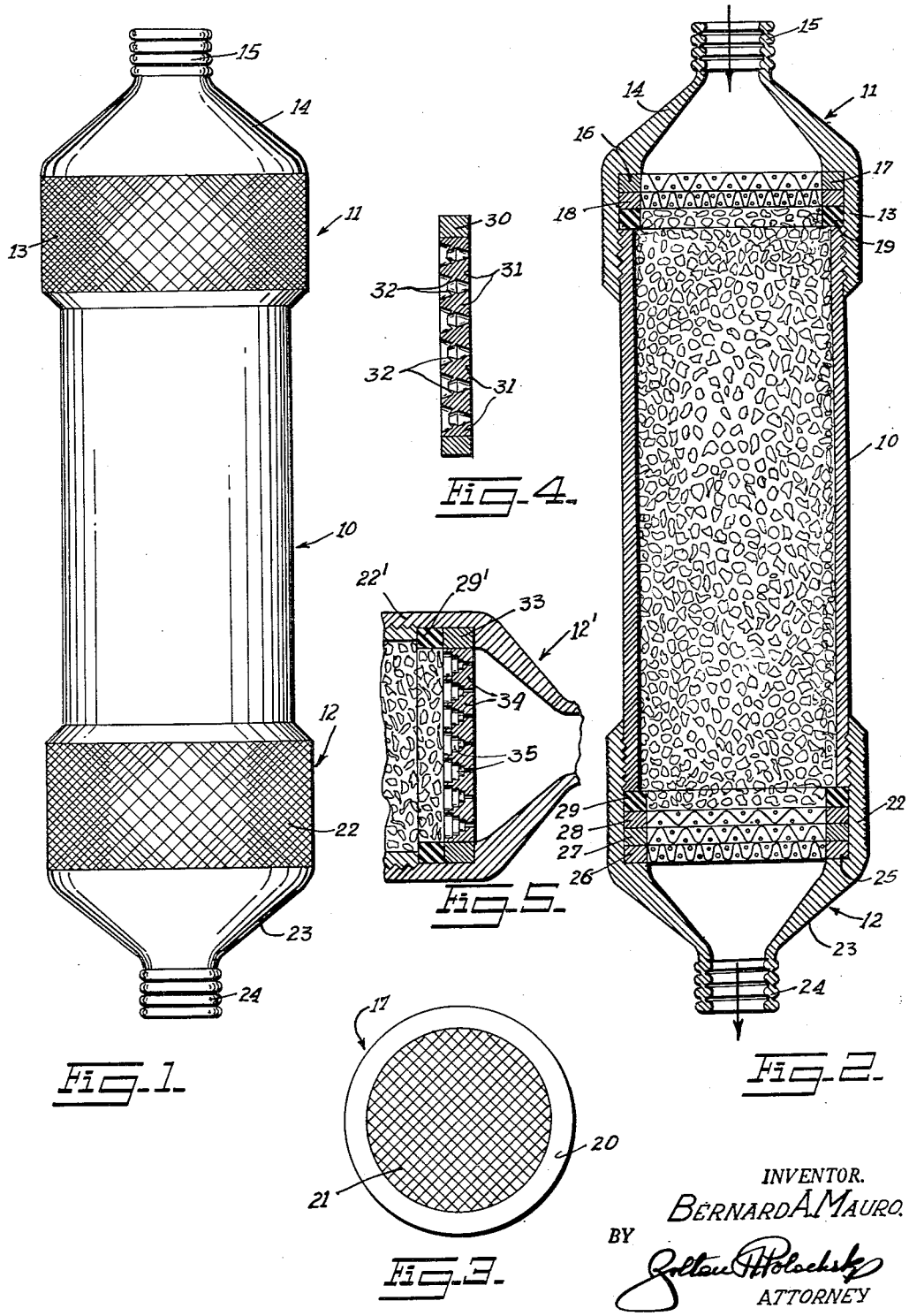

2,772,002

PERFORATED PLATE-TYPE STRAINER

Bernard A. Mauro, Brooklyn, N. Y., assignor of one-half to Matilda Johnson, Brooklyn, N. Y.

Application September 14, 1953, Serial No. 380,030

2 Claims. (Cl. 210—169)

The present invention relates to fluid filtering devices and, more particularly, to a sanitary, purifying, water filter.

Where tap water is drawn from pipes leading to a reservoir, impurities are often found in the water which take the form of minute particles as well as relatively larger particles of foreign matter. It is therefore insufficient for purposes of purification merely to strain the water in order to separate foreign matter therefrom inasmuch as the minute particles are likely to pass through even the finest straining screens.

Accordingly, it is the principal object of the invention to provide a water purifying filter which is effectively adapted to remove particles of all sizes, however minute, from the water flowing therethrough.

More specifically, it is an object of the invention to provide a water filter including a plurality of strainer elements having different characteristics operating in conjunction with a filter bed constituted by sand or a similar filtering substance.

Still another object of the invention is to provide a filter of the above type which may be quickly attached to a water line and which may be readily dismantled and reassembled for purposes of cleaning or replacing the component parts thereof.

Yet another object of the invention is to provide a filter strainer element adapted to agitate the water flowing therethrough to insure a more effective filtering action.

It is also the object of the invention ot provide a purifying water filter of simple and sturdy design which is highly efficient in operation and yet economical to manufacture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a longitudinal sectional view of a water filter in accordance with the invention.

Fig. 2 is an elevational view of the same filter.

Fig. 3 is a plan view of one of the strainer elements.

Fig. 4 is a radial section of a modified strainer element in accordance with the invention.

Fig. 5 is a radial section of still another modified form of a strainer in accordance with the invention.

Referring now to the drawings, and more particularly to Figs 1 to 3, a water purifying filter in accordance with the invention comprises a cylindrical open-ended casing 10, externally threaded at either end thereof. Threadably received on one end of casing 10 is an inlet coupling cap 11 and threadably received at the other end thereof is an outlet coupling cap 12.

Coupling cap 11 is constituted by an internally threaded collar section 13 which surrounds the end of casing 10, and an intermediate section 14 which converges into a terminal section 15. The internal and external surface of the terminal section is provided with a series of corrugations or threads to form a gripping surface for a flexible water pipe or hose forced thereover and effectively to seal such connection. Formed internally within cap 11 at the junction of the intermediate and the collar sections 13 and 14 is an annular shoulder 16, and clamped coaxially between the shoulder 16 and the associated edge of casing 10 are two disc-shaped strainer elements 17 and 18 and an annular gasket 19 to provide a water-tight seal between the casing 10 and cap 11.

As shown separately in Fig. 3, each strainer is constituted by a supporting bead or ring 20 and a straining screen or mesh 21. The gasket 19 is made of rubber or similar material having the same external and internal diameters as that of the ring 20 of the strainers, the external diameter of these components corresponding substantially to the internal diameter of the collar section 13. The external surface of cap 11 is knurled to facilitate its manual rotation on the end of casing 10, and when the cap is tightened the strainers 17 and 18 are firmly clamped between the cap shoulder 16 and gasket 19.

Cap 12 is similar in design to cap 11 and is provided with an internally threaded collar section 22 surrounding the other end of casing 10, a tapering intermediate section 23 and a terminal section 24 which is internally and externally corrugated or threaded to accommodate an outlet hose. At the junction of intermediate section 23 and collar section 22 is an internally formed annular shoulder 25 and clamped between the shoulder 25 and the edge of casing 10 are three strainer elements 26, 27 and 28 and an annular gasket 29. The strainers within cap 11 are provided with meshes of different degrees of fineness so that foreign particles which may succeed in passing strainer 17 will be obstructed in strainer 18. Strainers 28, 27 and 26 are preferably provided with meshes of progressively different fineness, strainer 26 being most fine so that ultimately even the smallest particles are trapped therein.

Within casing 10 there is provided a bed of filtering material such as sand, gravel, cutstone or any other suitable substance to which foreign substances in the water will adhere when percolating through the bed. If preferred, activated charcoal may also be included where it is desired to reduce the chlorine content of the tap water in order to improve its taste or suitability as a mixer with beverages. The filtering material should of course have a particle size larger than is admissible by any of the several strainers.

In practice, the casing 10 may be fabricated of 2" galvanized pipe, whereas the end coupling caps may be fabricated of brass or aluminum. It will be evident that the entire filter when clogged may be readily dismantled for cleaning of the strainers and replacement of the filter material, this being accomplished simply by unscrewing the end caps. Thus the device is highly sanitary and affords a practical home filter entailing minimum skill to install and clean.

In order to strain the water more effectively so that foreign particles will lodge in the strainers, strainers of the type shown in Fig. 4 may be used in lieu of the mesh strainers shown in Figs. 1 and 3. Referring now to Fig. 4, it will be seen that the strainer comprises an outer ring 30 surrounding a foraminated disc 31, each perforation of which is tapered in the axial direction. Along the wall of the tapered perforation are a plurality of discrete burrs 32 which serve to snarl particles flowing through the perforations and also to impart a certain degree of turbulence to the water so that particles which are not caught are at least set into agitated motion to facilitate their screening in the succeeding strainer.

In the modified strainer shown in Fig. 5, a ring support 33 is also provided with a foraminated disc 34 wherein each perforation has a stepped wall whose purpose is similar to the burrs 32 in Fig. 4, the stepped wall 35 acting to lodge foreign particles passing through the perforation.

It is to be understood that this filter may be made any size, shape and material and be connected to suitable fittings such as elbows, T's, etc.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A water purifying filter comprising an externally threaded tubular casing open at each end, cap means having internal threads secured to said tubular casing to close said ends, an internal annular shoulder spaced from said internal threads in said cap means and strainer means between the internal threads and shoulder to filter minute particles in the water, said strainer means comprises an outer ring, a disc retained in said ring, tapered perforations in the walls of the disc, and a plurality of discrete burrs along the interior walls of the tapered portion.

2. The combination of claim 1 wherein the burrs extend laterally from the walls of the tapered portion towards the open area in the form of prongs to snarl particles flowing through the perforations and providing turbulence for the water.

References Cited in the file of this patent

UNITED STATES PATENTS

| | | |
|---|---|---|
| 87,385 | Winchester | Mar. 2, 1869 |
| 2,066,793 | Mesurac | Jan. 5, 1937 |
| 2,127,397 | Freedlander | Aug. 16, 1938 |
| 2,504,683 | Harnley | Apr. 18, 1950 |
| 2,520,124 | Chaney et al. | Aug. 29, 1950 |
| 2,605,901 | Morrison et al. | Aug. 5, 1952 |
| 2,630,227 | Rodwell | Mar. 3, 1953 |

FOREIGN PATENTS

| | | |
|---|---|---|
| 324,924 | Great Britain | Feb. 3, 1930 |
| 470,148 | Canada | Feb. 3, 1953 |